Patented Oct. 8, 1940

2,217,309

UNITED STATES PATENT OFFICE 2,217,309

MARGARINE PRODUCT AND METHOD OF MAKING SAME

Albert K. Epstein and Benjamin R. Harris, Chicago, Ill., and Marvin C. Reynolds, deceased, late of Hinsdale, Ill., by Lulu E. Reynolds, Hinsdale, Ill., and The First National Bank of Chicago, Chicago, Ill., coexecutors No Drawing. Application February 25, 1938, Serial No. 192,644

14 Claims. (Cl. 99—123)

Our invention relates to improvements in the manufacture of margarine and similar types of emulsions. It relates more in particular to means for producing a margarine or similar emulsion, which will not "weep"; that is, in which the aqueous substances are retained under all normal conditions of storing and using the product. Certain other specific advantages are obtained from the practice of the invention, as will be pointed out.

Referring to the manufacture of margarine, which substance may be used as illustrative, the product is made by first forming an emulsion of oils and fats with an aqueous material such as milk, the emulsion being formed by churning in a manner familiar to those acquainted with the industry. The emulsion, customarily made at a temperature above room temperature, at which the oleaginous ingredients are liquid, is then stabilized by crystallization by being brought in contact with a colder medium, such as water or a cooled metal surface. The chilled solidified emulsion is then tempered and kneaded together by means of rollers or other suitable apparatus in order to expel excessive moisture and to make a homogeneous plastic mass of butter-like consistency.

The completed margarine contains considerable moisture, ranging generally between approximately 10% and 16% of the whole, and this moisture is present in an emulsified condition, and also in a so-called loosely bound condition, or in a free state, or both. After the margarine is allowed to remain for a considerable length of time in the form of a print, a portion of the water leaks out, wetting the carton, and also taking out a certain amount of salt which eventually becomes deposited in crystals on the exterior of the package.

The principal object of our present invention is the production of an improved non-leaky margarine.

Another object is the provision of a process for producing a non-leaky margarine.

Another object is to incorporate seasoning or preserving materials in the margarine in such a manner as to retain substantially all of such materials introduced.

Other objects and features of the invention will be apparent from a consideration of the following detailed description.

In carrying out our invention, either the "wet" or dry process for manufacturing the product can be employed, our invention being adapted for use with either process. In carrying out our process the margarine is produced in any of the ways now known in the art, until the final stage, in which the margarine is treated to render the same butter-like in consistency, as, for example, by treatment on a so-called butter worker, blender or the like. We have discovered that if, at this point in the manufacture, when the margarine has substantially the same moisture content as that desired in the final product, a hydrophilic colloid, capable of imbibing water at ordinary temperatures, is introduced into the margarine, it will become emulsified, or dispersed in the margarine in such a way as to pick up the excess moisture, which is not in a fully emulsified condition and which is relatively only loosely bound. By this means, the amount of moisture held in the margarine can be controlled and a substantially dry product obtained. The hydrophilic colloids adapted for our purposes are preferably vegetable carbohydrates, such as the gums; for example, gum tragacanth, gum acacia, or the like.

We are aware that various gums, such as gum acacia and other vegetable gums have been used in the manufacture of margarine heretofore, but usually such gums have been churned together with the aqueous liquid and oleaginous materials, and we have found that when used in this way and so introduced, the gums have no efficacy as far as preventing weeping or leaking of the final margarine product is concerned. We believe that when the hydrophilic colloid is introduced in this manner it becomes substantially totally hydrated in the large quantity of aqueous liquid present. Consequently when the final product is obtained, the hydrated colloid has no effect in holding the loose moisture present in and among the margarine crystals and adhering only loosely to them, and such liquid will readily leak out upon standing.

It has also been proposed to preserve butter and animal fats as well as mixtures of butter with so-called margarine by adding thereto from 3% to 20% by weight, of gum arabic, either in powdered form or solution, the surface of the butter or the like, after being packed into the usual receptacles, being sprinkled with a thin layer of powdered gum arabic before putting the cover on the receptacle. The purpose of the addition of gum arabic was to preserve the butter or the like from bacterial or like spoilage during relatively long periods of storage or during shipment. When the butter or the like was ready for consumption, the gum arabic was eliminated therefrom by washing with water.

In accordance with our invention, the gum or hydrophilic colloid is employed in amounts insufficient to effect preservation thereof against bacterial decomposition, usually ½% being sufficient although percentages of the order of about 1% may be employed with satisfactory results. As we have indicated above, the hydrophilic colloid is only partially hydrated prior to its introduction into the margarine. The final margarine product is adapted for immediate consumption and possesses essentially identically the same appearance, character and uses as conventional margarines. The hydrophilic colloid is present in such relatively small amounts that it is unnecessary to wash out the same prior to use. Indeed, it is intended and adapted for use in the same way as conventional margarines without further treatment. It will be seen, therefore, that our invention differs radically in concept and procedure and in the ultimate product obtained from the teachings of the prior art.

We may introduce the hydrophilic colloids of our invention into the margarine, after the emulsion has been made, in various ways, but the colloids cannot be added in a fully hydrated condition or they will not have the effect desired. A suitable method of introducing the substances is to form a paste in which the colloids are present in a partially hydrated condition, and then work this paste into the finished margarine, with suitable apparatus, such as a butter worker or blender.

Considering the so-called wet-crystallizing process, with which our invention is practiced with considerable advantage, the emulsion is made in the usual manner in the churn and then crystallized in a body of cold water. Tempering can be carried on also in a water vat in which the water is maintained at a relatively warmer temperature. The margarine is removed from the tempering vat, the excess moisture allowed to drain off and the crystals worked on a butter worker in order to remove most of the excess moisture. The margarine may then be placed in a blending machine equipped with suitable kneading arms and the hydrophilic colloid in the form of a paste is added, with continued working, and the remaining moisture in the margarine is dried up by the action of the colloid and a substantially dry product is obtained.

According to the present wet-crystallizing practice, when tempering of the margarine has been completed it will include on an average approximately 35% to 40% of water. This water is removed by working the margarine with suitable equipment until the moisture content is substantially what it is to be in the finished product, for example 15%. When the moisture content has been reduced sufficiently, the hydrophilic colloid paste and other treating ingredients may then be introduced. After the incorporation of these substances, the margarine is subjected to a blending process in which it is worked thoroughly until a final product of proper texture and butter-like consistency is produced. The working of the margarine after tempering, therefore, consists in general of two steps; namely, working and blending. In some establishments both of these processes are carried on with the same equipment. We may carry on our process in the same manner, the margarine being worked until the moisture content is satisfactory, and then the ingredients of our invention added and the working continued to produce the proper blending action. We prefer, however, to treat the margarine first to work out the excess moisture with any of the usual equipment, such as a rotary table worker, and at this point introduce the margarine into a blending machine in which the process is completed. In the blending operation, it is customary in many establishments to introduce additional milk for the purpose of imparting an improved flavor. This can be done in our process, but the added milk should be taken into consideration in determining the final moisture content.

In the dry process, the margarine is removed from the cooling surfaces with substantially the moisture content which the finished product is to have, except of course where additional moisture is introduced by a blending operation. When using the dry process it may be desirable to introduce additional moisture in the butter working or in the blending stage. This can be accomplished, and our invention will lend itself readily to a process of introducing the additional moisture to bring the final moisture content up to that which is desired in the finished product. In any event, a substantially dry final product may be obtained.

The proportions of the hydrophilic colloid employed may vary to some extent, depending upon the particular hydrophilic colloid selected and the details of the process as carried out. In general, from ½% to 1 and ½%, based upon the weight of the margarine, is adequate for our purposes.

In preparing the paste, the hydrophilic colloid should be distributed evenly and uniformly. We have found it advisable to wet the colloid material with a small amount of an aqueous-insoluble substance, such as cottonseed oil, for example, thus separating the dry colloid particles from each other. Cultured milk may then be incorporated into this mixture with continuous stirring, the preliminary separating of the dry particles aiding in producing a uniform paste. In using the oil, only enough should be used to wet the dry powder sufficiently to bring about the required separation of the particles.

In order that those skilled in the art may even more fully understand our invention, we set forth hereinbelow illustrative embodiments thereof, it being understood, of course, that the invention is not to be limited thereto.

*Example I*

600 pounds of cocoanut oil (melting point 76 degrees F.), 120 pounds of hydrogenated vegetable oil (melting point 110 degrees F.), and 80 pounds of cottonseed oil were melted together, to comprise the oleaginous phase of the margarine, at a temperature above the melting point of all of the constituents thereof. To the resulting oleaginous mixture, 25 gallons of cultured milk were then added and emulsified therewith, and the resulting emulsion was crystallized and processed in the usual manner to produce a plastic emulsion of oleaginous and aqueous constituents and about 7 pounds of gum arabic, previously formed into a paste with about 28 pounds of milk, were then blended into the plastic margarine emulsion. To accomplish this result, the plastic margarine emulsion, which, by working, had been freed of a large part of the moisture originally introduced into the churn or emulsifier and that picked up in the crystallizing vat when the "wet" process was used, was introduced into a conventional type of blender with the gum arabic paste, and the blender was operated until the gum arabic had been thoroughly distributed throughout the margarine emulsion and a loosely bound or unemulsified aqueous constituent had been dried up.

*Example II*

Approximately 800 pounds of cocoanut oil, 150 pounds of so-called hydrogenated cocoanut oil (melting point 110 degrees F.), 50 pounds of peanut oil, and 40–45 gallons of cultured milk were emulsified together in a conventional manner and the resulting emulsion was then crystallized according to the dry method. The resulting margarine emulsion was tempered and then was introduced into a blender with a previously prepared paste containing gum tragacanth. The paste was made by initially wetting 12 pounds of gum tragacanth with 12 pounds of cottonseed oil and then dispersing the resulting mixture in 15 pounds of ripened milk.

*Example III*

About 850 pounds of lard, 450 pounds of oleo stearine, 175 pounds of liquid cottonseed oil, and 75 pounds of hydrogenated cocoanut oil were initially mixed together at a temperature above that of the highest melting point constituent and the resulting mixture of oils and fats was then emulsified with approximately 55 gallons of cultured milk. After crystallizing, tempering and working to produce a plastic margarine emulsion having approximately the amount of moisture desired in the final product or somewhat less, about 20 pounds of gum tragacanth, in the form of a paste with about 25 pounds of cultured milk, were blended into the plastic margarine product, the blending operation being continued until the gum tragacanth had been thoroughly dispersed throughout the body of the plastic margarine mass and until the interstitial or unbound moisture had been incorporated.

In place of gum tragacanth and gum acacia, it will be appreciated that other types of hydrophilic colloids may be used, such as pectin, for example.

We believe that in introducing our partially hydrated colloid, after the margarine has already been processed substantially to the final stage, the hydrated colloid has an effect in changing the surface characteristics of the margarine particles in such a manner as to cause the moisture particles to stick to the margarine more tenaciously. At the same time the colloid itself apparently imbibes some additional moisture, thus resulting in a margarine, which, when made into a print, will be substantially dry and will not leak. For the best results, a hydrophilic colloid should be used, which, when partially hydrated, can be added to the margarine and will not produce lumps at the temperature at which the margarine is maintained during the blending period.

In preparing and introducing the gum we can incorporate other substances therewith, which it may be desired to introduce into the margarine. For example, lecithin and lecithin-like substances, anti-spattering compounds, as described in Harris Patent No. 1,917,250, or similar margarine improving substances can be introduced with the hydrophilic colloid. Such substances can be formed into a paste with the hydrophilic colloids, or may merely be incorporated into the margarine at the same time. Salt and other flavoring materials and sodium benzoate and similar preservative substances may be introduced into the margarine with the hydrophilic colloid. When introducing water-soluble substances, such as salt and sodium benzoate, we have found that we can introduce substantially the exact amount into the margarine, which will be desired in the final product. Heretofore, when these substances were blended or worked into the margarine they would form solutions in the water existing in the margarine and this water would separate out carrying a portion of the salt or sodium benzoate therewith. Working the margarine to distribute the salt and similar products, as heretofore practiced, naturally caused the further separation of water, which would carry relatively large amounts of such substances with it; while in our process, after these products are introduced with the hydrophilic colloids, substantially none of the moisture then contained in the margarine separates out, and there is practically no loss of these water soluble ingredients. We have determined that often only approximately ½ of the total amount of such water soluble substances added to the margarine actually remain therein when our process is not employed.

In introducing the water soluble flavoring or preserving substances they are either incorporated with the paste, prepared with the hydrophilic colloids, or they are incorporated by being mixed at the same time or shortly after the hydrophilic colloid is added to the margarine. It is merely sufficient that the hydrophilic colloid be introduced in such a way and at such a time as to hold in the margarine substantially all of the loosely bound moisture and so prevent the loss from the margarine of substances which otherwise might be partially lost during working or blending, and while the margarine is being worked and formed into prints.

When forming the paste, we can preliminarily separate the colloid particles by mixing the same with salt, thus facilitating the dispersing of the colloid in the milk. The salt used may be all or part of that used in the margarine and, when so introduced, will be retained in the margarine substantially in its entirety.

The invention has been described in connection with the manufacture of margarine, but it can be used in the manufacture of all similar types of emulsions, such as the substance known as puff paste. The term "margarine," unless otherwise qualified, may therefore be taken to include emulsions of oleaginous and aqueous materials, colored or uncolored, whether employing water, brine or sweet or cultured milk.

The present application is a continuation-in-part of our prior application Serial No. 504,220, filed December 22, 1930.

What we claim as new and desire to protect by Letters Patent of the United States is:

1. The method of manufacturing margarine which comprises producing a liquid emulsion of aqueous and oleaginous materials, cooling the liquid emulsion to solidify the same, forming a paste of aqueous material and a powdered hydrophilic colloid so that the colloid is only partially hydrated, and working the paste into the solid margarine.

2. The method of manufacturing margarine, which comprises producing a liquid emulsion of aqueous and oleaginous materials, cooling the liquid emulsion to solidify the same, forming a paste of aqueous material and a relatively small amount of a powdered hydrophilic colloid so that the colloid is only partially hydrated, and working the paste into the solid margarine, and working into the margarine, with the paste, a water soluble treating substance, whereby substantially the total amount of treating substance added to the margarine is reained therein.

3. The method of producing margarine, which comprises processing the margarine to the working stage, forming an aqueous paste of a hydrophilic colloid capable of imbibing moisture at room temperature so that the colloid is only partially hydrated and working said paste into the margarine.

4. The method of producing margarine, which comprises processing the margarine to the working stage, adding to a powdered hydrophilic colloid material a water soluble non-aqueous substance capable of separating the colloid particles, incorporating an aqueous material therewith to form a paste in which the colloid is only partially hydrated and then working the paste into the margarine.

5. The method of producing margarine, which comprises processing the margarine to the working stage, mixing together a quantity of powdered hydrophilic colloid material and salt, adding aqueous material thereto to form a paste in which the colloid is only partially hydrated and then working the paste into the margarine.

6. The method of producing margarine, which comprises processing the margarine to the working stage, forming a paste of powdered gum arabic and milk, in proportions of about one pound of gum to four pounds of milk so that the gum arabic in the paste is only partially hydrated, and incorporating the paste into the margarine by blending, the gum being present in proportions of not more than approximately one-half per cent of the total quantity of margarine.

7. The method of producing margarine, which comprises processing the margarine to the working stage, forming a paste of powdered gum arabic and milk, in proportions of about one pound of gum to four pounds of milk so that the gum arabic in the paste is only partially hydrated, and incorporating the paste into the margarine by blending, the gum being present in proportions of not more than approximately one-half per cent of the total quantity of margarine, and introducing a water soluble treating substance into the margarine, with the gum, whereby substantially the entire amount of such treating substance is retained in the margarine.

8. The method of producing margarine which comprises forming a plastic emulsion of aqueous and oleaginous material, forming a paste of a powdered hydrophilic colloid and an aqueous liquid whereby the hydrophilic colloid is partially hydrated, and blending with the plastic emulsion a relatively small amount of the paste so that the amount of hydrophilic colloid comprises not more than ½% of the final margarine product.

9. An improved non-weeping margarine comprising an emulsion of oleaginous and aqueous materials, a relatively small proportion of an antispattering substance and a relatively small amount of a partially hydrated vegetable colloid capable of absorbing water at ordinary room temperature.

10. An improved vegetable margarine, substantially devoid of the tendency of moisture to leak therefrom, said margarine comprising a previously prepared plastic emulsion of aqueous material and oleaginous material including a member selected from the group consisting of hydrogenated cocoanut oil and hydrogenated cottonseed oil, and having intimately incorporated therewith a hydrophilic colloid only partially hydrated whereby it possesses the capacity for absorbing interstitial moisture of the plastic margarine emulsion, the amount of the hydrophilic colloid being not more than about 1%, based on the weight of the margarine.

11. An improved, substantially non-weeping butter substitute, totally devoid of butter-fat, comprising a plastic emulsion of aqueous material and oleaginous material including a member selected from the group consisting of hydrogenated coconut oil and hydrogenated cottonseed oil, a preservative proportion of common salt, and an incompletely hydrated hydrophilic colloid, said colloid being present in amounts sufficient to absorb interstitial moisture of the butter substitute but insufficient to exert a preservative action on the oleaginous material present in said butter substitute.

12. An improved, substantially non-weeping butter substitute in accordance with claim 11, wherein the oleaginous constituent comprises about 80% by weight of the margarine, the aqueous material about 15% to 16%, the salt about 3%, and the hydrophilic colloid not more than about 1%.

13. An improved vegetable margarine, substantially devoid of the tendency of moisture to leak therefrom, comprising a plastic emulsion of aqueous material and oleaginous material derived from vegetable sources, and an incompletely hydrated hydrophilic colloid, said colloid being present in amounts sufficient to absorb interstitial moisture of the margarine but insufficient to exert a preservative action on the oleaginous material present in said margarine.

14. An improved vegetable margarine, substantially devoid of the tendency of moisture to leak therefrom, comprising a plastic emulsion of aqueous material and oleaginous material including a hydrogenated vegetable oil, and an incompletely hydrated hydrophilic colloid, said colloid being present in amounts sufficient to absorb interstitial moisture of the margarine but insufficient to exert a preservative action on the oleaginous material present in said margarine.

ALBERT K. EPSTEIN.
BENJAMIN R. HARRIS.
LULU E. REYNOLDS,
and
THE FIRST NATIONAL BANK
OF CHICAGO,
By RAY C. OSGOOD,
*Vice-President,*
*As Executors of the Last Will and Testament of Marvin C. Reynolds, Deceased.*